(12) United States Patent
Walker et al.

(10) Patent No.: US 10,706,462 B1
(45) Date of Patent: Jul. 7, 2020

(54) COUPON PROCESSING SYSTEM COMMUNICATING DIGITAL COUPON OFFER BASED UPON USER BID REQUEST AND RELATED METHODS

(71) Applicant: INMAR CLEARING, INC., Winston-Salem, NC (US)

(72) Inventors: Jess D. Walker, Georgetown, TX (US); Bryan Bartow, Leander, TX (US); David E. Johnson, Cedar Park, TX (US); Chris Rebstock, Round Rock, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 96 days.

(21) Appl. No.: 15/712,333

(22) Filed: Sep. 22, 2017

(51) Int. Cl.
*G06Q 30/08* (2012.01)
*G06Q 30/02* (2012.01)
*G06Q 20/32* (2012.01)
*G06Q 20/36* (2012.01)

(52) U.S. Cl.
CPC .......... *G06Q 30/08* (2013.01); *G06Q 20/322* (2013.01); *G06Q 20/36* (2013.01); *G06Q 30/0238* (2013.01); *G06Q 30/0275* (2013.01)

(58) Field of Classification Search
CPC ...... G06Q 30/08; G06Q 20/322; G06Q 20/36; G06Q 30/0238; G06Q 30/0275
USPC ........................................................ 705/14.1
See application file for complete search history.

(56) References Cited

U.S. PATENT DOCUMENTS

| | | | |
|---|---|---|---|
| 8,831,987 B2 | 9/2014 | Knapp et al. | |
| 2002/0035536 A1 | 3/2002 | Gellman | |
| 2008/0040229 A1 | 2/2008 | Gholston | |
| 2008/0140520 A1* | 6/2008 | Hyder | G06Q 20/342 705/14.1 |
| 2010/0228631 A1 | 9/2010 | Zhang et al. | |
| 2011/0313857 A1 | 12/2011 | Nice et al. | |
| 2012/0158508 A1 | 6/2012 | Kilroy et al. | |
| 2012/0271696 A1* | 10/2012 | Akbar | G06Q 30/02 705/14.23 |
| 2013/0332283 A1* | 12/2013 | Faith | G06Q 30/0239 705/14.64 |
| 2014/0180802 A1* | 6/2014 | Boal | G06Q 30/0245 705/14.49 |

* cited by examiner

*Primary Examiner* — Colleen A Hoar
(74) *Attorney, Agent, or Firm* — Allen, Dyer, Doppelt + Gilchrist, P.A.

(57) ABSTRACT

A coupon processing system may include a remote user device and a coupon processing server. The coupon processing server is configured to receive a user bid request from the remote user device and collect digital coupon offers from coupon providers based upon the user bid request. The coupon processing server is configured to select at least one digital coupon offer and communicate the at least one digital coupon offer to the remote user device.

19 Claims, 4 Drawing Sheets

35

COUPON PROVIDER GRAPHICAL USER INTERFACE

CURRENT BIDS FOR USER 1 REQUEST:
　　ANONYMOUS PROVIDER 1 - $0.50 OFF A 12-PACK OF 16-OUNCE CANS OF COLA A
　　ANONYMOUS PROVIDER 2 - $0.25 OFF A 2-LITER BOTTLE OF COLA B
　　ANONYMOUS PROVIDER 3 - $1.00 OFF A (2) 12-PACKS 16-OUNCE CANS OF COLA A

YOUR CURRENT BID FOR USER 1 REQUEST:
　　$0.75 OFF A 12-PACK OF 16-OUNCE CANS OF COLA A

THRESHOLD: $1.00 OFF A 12-PACK OF 16-OUNCE CANS OF COLA A

INCREMENT: $0.05

CURRENT BIDS FOR USER 2 REQUEST:
　　ANONYMOUS PROVIDER 1 - $0.30 OFF A 12-OUNCE PACKAGE OF CRACKER A
　　ANONYMOUS PROVIDER 2 - $1.25 OFF A 12-OUNCE PACKAGE OF CRACKER A AND DIP D

YUR CURRENT BID FOR USER 2 REQUEST:
　　ANONYMOUS PROVIDER 1 - $0.50 OFF A 16-OUNCE PACKAGE OF CRACKER C

THRESHOLD: $1.00 OFF

INCREMENT: $0.25

REMAINING BUDGET: $1,050.25

FIG. 4

COUPON PROCESSING SYSTEM COMMUNICATING DIGITAL COUPON OFFER BASED UPON USER BID REQUEST AND RELATED METHODS

TECHNICAL FIELD

The present invention relates to the field of electronics, and more particularly, to the processing of coupons and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

The ability to target or distribute a coupon to a user may have an associated value independent of its redeemable value. Additionally, information about a user may have a value to a coupon provider greater than the redeemable value of the coupon. Accordingly, a coupon provider may pay a premium to have its coupon reach the user. U.S. Patent Application No. 2008/0040229 to Gholston discloses auctioning the right to distribute an electronic coupon. U.S. Patent Application Publication No. 2002/0035536 to Gellman discloses submitting a potential customer's list to a reverse auction system and receiving a bid on the list and presenting the bid to the user. The bid includes a price for the list and may also include a coupon. Manufacturers' information can be entered by manufacturers into, for example, a coupon and other offerings database including coupon, incentive, and other offerings information, which is accessed by a bid engine. The manufacturers retrieve information about consumer shopping preferences from the bid engine through a consumer history database and from this information, the manufacturers have the ability to formulate incentive coupon offerings.

SUMMARY

A coupon processing system may include a remote user device and a coupon processing server. The coupon processing server may be configured to receive a user bid request from a remote user device and collect a plurality of digital coupon offers from a plurality of coupon providers based upon the user bid request. The coupon processing server may also be configured to select at least one digital coupon offer from the plurality thereof and communicate the at least one digital coupon offer to the remote user device.

The coupon processing server may be configured to anonymously communicate the plurality of digital coupon offers from each of the plurality of coupon providers to a given one of the plurality of coupon providers without identifying the coupon providers. The coupon processing server may be configured to store a plurality of previously purchased products by the user and the plurality of digital coupon offers may be for at least one of the plurality of previously purchased products, for example.

The user bid request may be for a given product and the plurality of digital coupon offers may be for the given product, for example. The given product may include a plurality of products in a same product-type category.

The coupon processing server may be configured to store the at least one digital coupon offer in a digital wallet associated with the user, for example. The coupon processing server may be configured to communicate the at least one digital coupon offer from the plurality thereof based upon input from the remote user device.

The at least one digital coupon offer may include a plurality of digital coupon offers. The coupon processing server may be configured to rank the plurality of digital coupon offers based upon a value thereof, for example.

The coupon processing system may further include a point-of-sale (POS) terminal. The coupon processing server may be configured to communicate the at least one digital coupon offer to the remote user device for redemption at the POS terminal, for example. The remote user device may include a mobile wireless communications device, for example.

A method aspect is directed to a method of processing a coupon. The method may include using a coupon processing server to receive a user bid request from a remote user device and collect a plurality of digital coupon offers from a plurality of coupon providers based upon the user bid request. The coupon processing server may also be used to select at least one digital coupon offer from the plurality thereof and communicate the at least one digital coupon offer to the remote user device.

BRIEF DESCRIPTION OF THE DRAWINGS

FIG. 4 is a diagram of a graphical user interface for a given coupon provider according to an embodiment.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
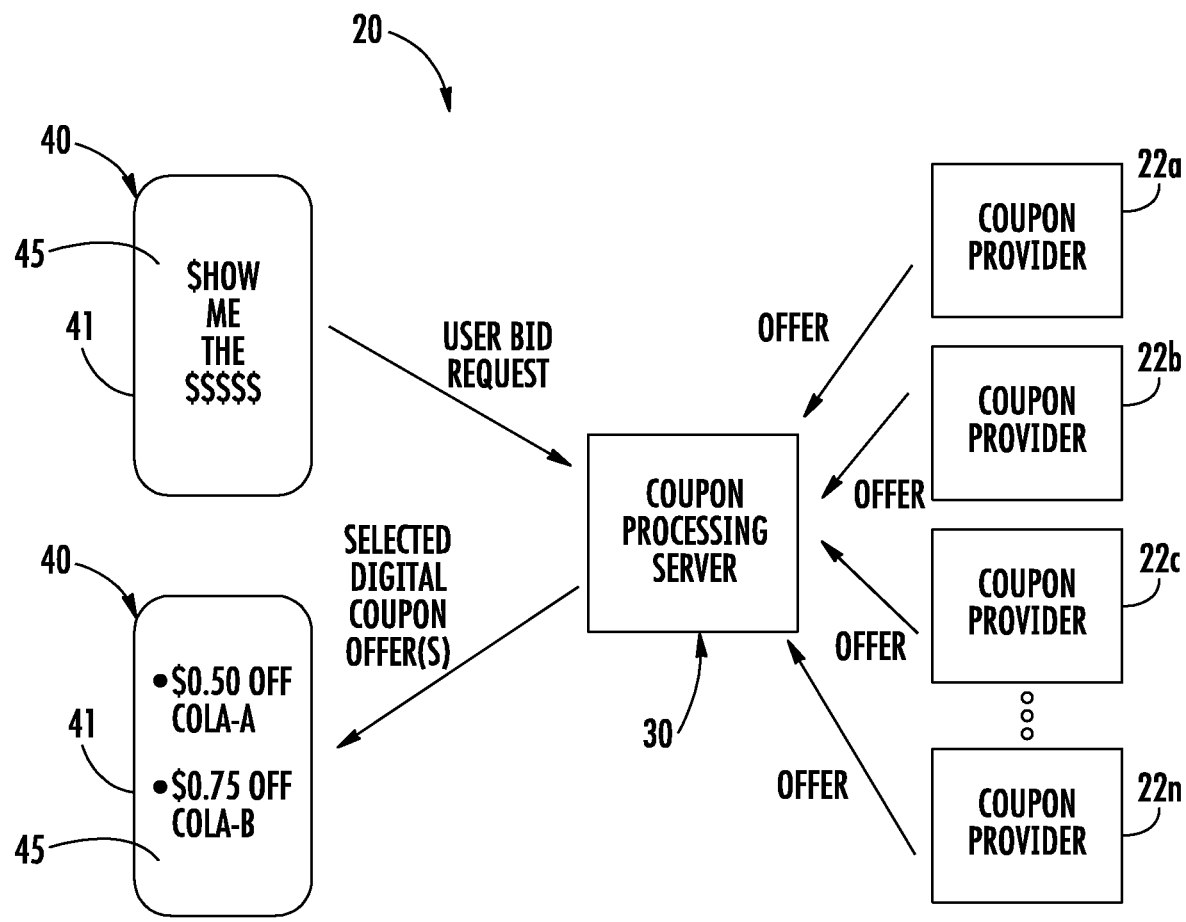
FIG. 1 is a schematic diagram of a coupon processing system according to an embodiment.
Figure 2:
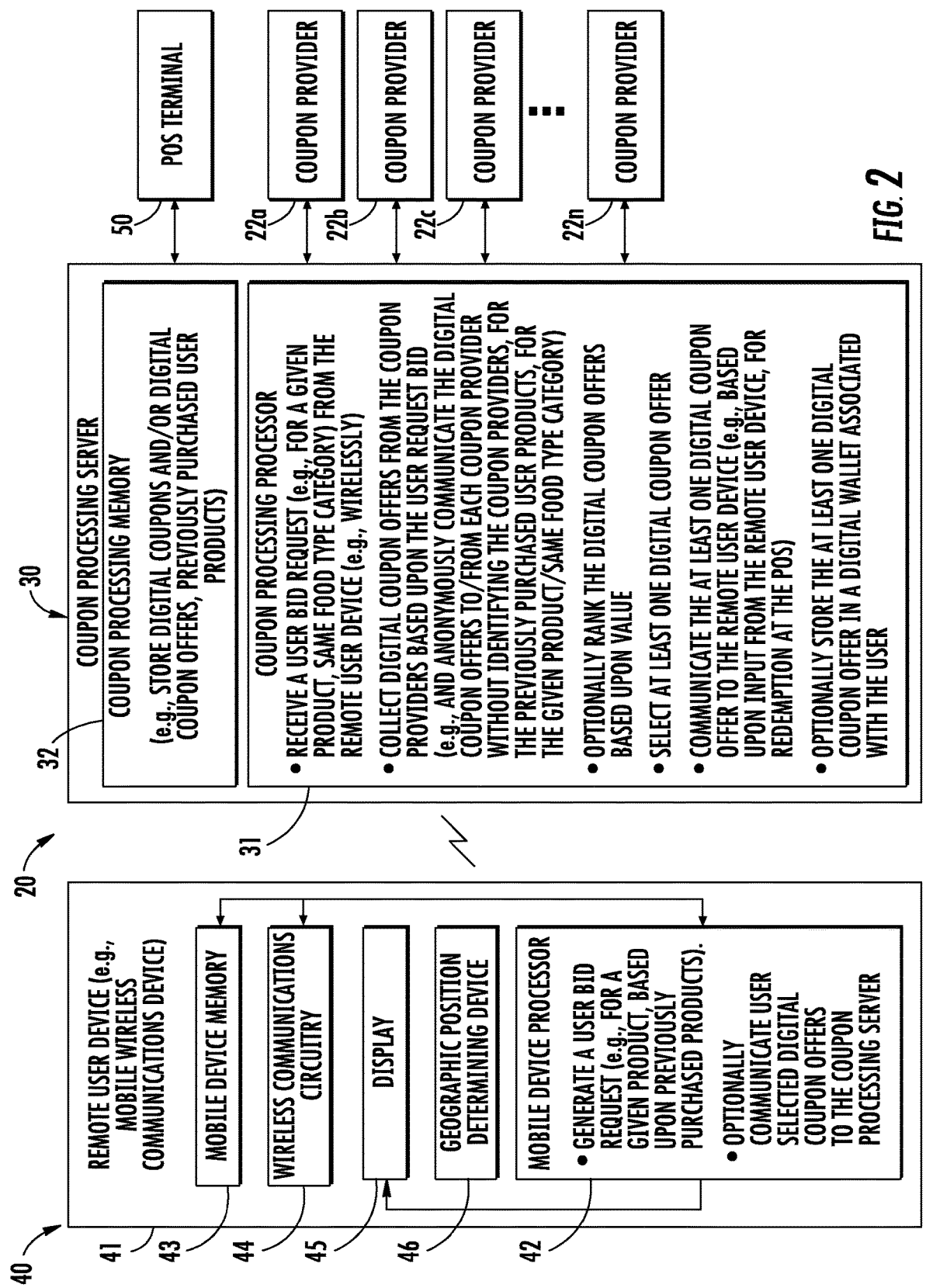
FIG. 2 is a schematic block diagram of the coupon processing system of FIG. 1.

Referring initially to FIGS. 1 and 2, a coupon processing system 20 includes a coupon processing server 30. The coupon processing server 30 includes a coupon processing processor 31 and a coupon processing memory 32 coupled to the coupon processing processor. The coupon processing memory 32 stores promotional offers, for example, associated with a particular product offered at a retail location.

More particularly, the coupon processing memory 32 may store digital coupons and/or digital coupon offers from coupon providers 22a-22n. Of course, the coupon processing memory 32 may store other and/or additional types of promotional offers.

The coupon processing system 20 also includes a remote user device 40, which is illustratively in the form of a mobile wireless communications device, e.g. cellphone, associated with a user. The mobile wireless communications device 40 illustratively includes a portable housing 41, a mobile device processor 42, a mobile device memory 43 coupled to the mobile device processor, and wireless communications circuitry 44 coupled to the mobile device processor. The mobile wireless communications device 40 also includes a display 45, such as, for example, a touch display, carried by the portable housing 41 and coupled to the mobile device processor 42. The mobile wireless communications device 40 may include one or more input devices, such as for example, a camera, pushbutton, and/or other types of input devices. The mobile wireless communications device 40 may also include other output devices.

The mobile wireless communications device 40 may also include a geographic position determining device 46 cooperating with the mobile device processor 42 to communicate a geographic position of the mobile wireless communications device to the coupon processing server 30. The geographic position determining device 46 may be a global positioning system (GPS) device. The mobile wireless communications device 40 may be a mobile phone or smartphone, a tablet computer, or other type of mobile wireless communications device, as will be appreciated by those skilled in the art. While the remote user device 40 is illustratively in the form of a mobile wireless communications device, it will be appreciated by those skilled in the art that the remote user device may be in the form of another type remote user device.

The coupon processing system 20 also includes a point-of-sale (POS) terminal 50, for example, located at a retail location. The POS terminal 50 may be remote from the coupon processing server 30, for example. The POS terminal 50 may include a payment card reader which may be in the form of a magnetic card reader, optical card reader, and/or a touchless, e.g., near-field communication (NFC) card reader.

Figure 3:
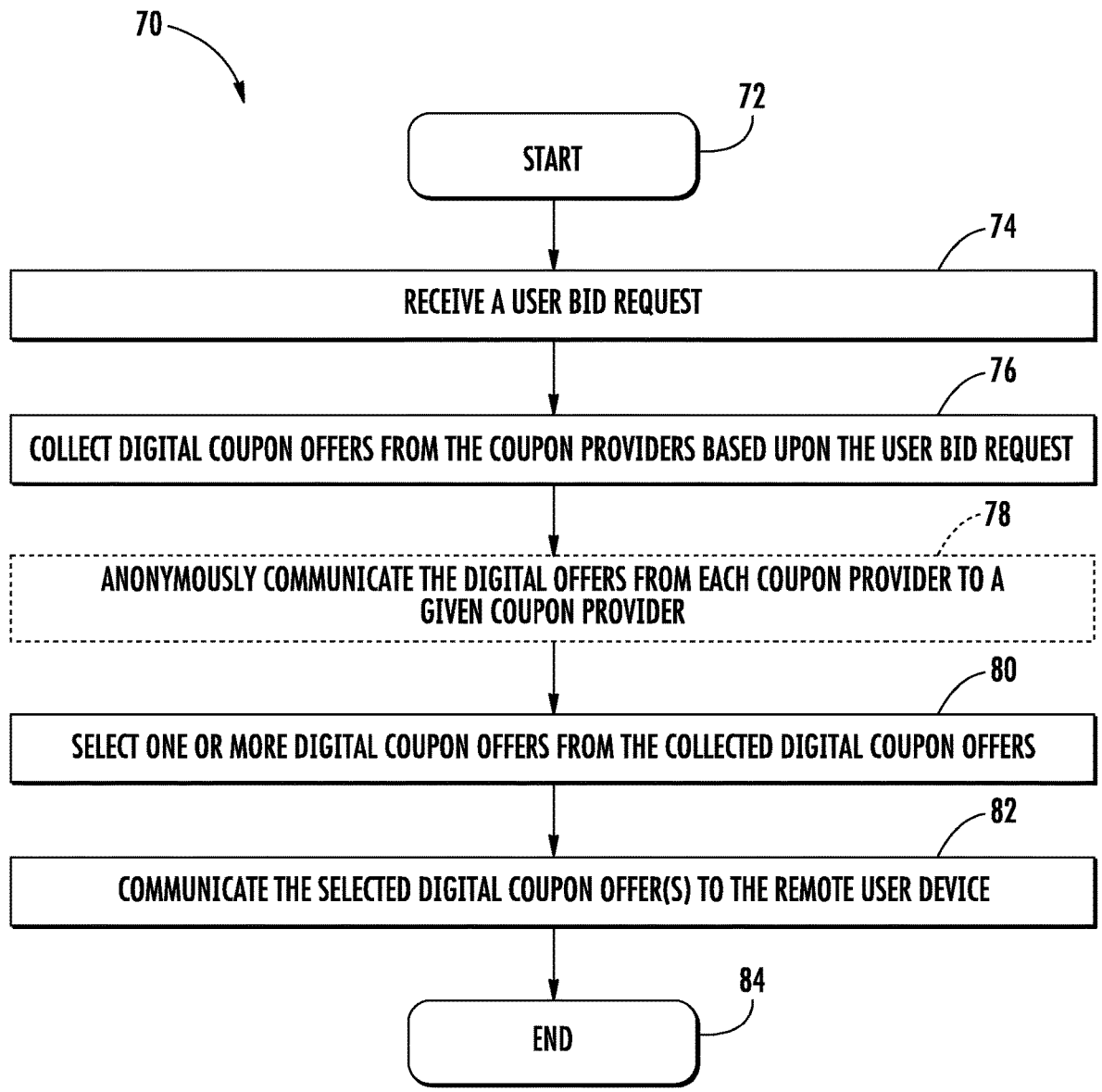
FIG. 3 is a flowchart illustrating operation of the coupon processing system of FIG. 1.

Referring now additionally to the flowchart 70 in FIG. 3, and beginning at Block 72, operation of the coupon processing system will now be described. At Block 74, the coupon processing server 30 receives a user bid request, for example, wirelessly, from the remote user device or mobile wireless communications device 40. More particularly, the user may provide input by way of an input device of the mobile wireless communications device 40. In other words, the user when desirous of viewing digital coupon offers, may provide input to a display of "Show Me the $$" or "Bribe Me." Of course, the user may provide input in response to other types of displays or output.

The user bid request may include a request for a bid of a given product. The given product may be a specific product (e.g., by uniform product code (UPC)) or may be a given class or grouping of products (e.g., food-type, family or class code, cereal, soda, etc.) For example, the user may submit a user bid request for a 12-pack of 16-ounce cans of "Cola-A."

In some embodiments, the user bid request may be for a list of desired products or previously purchased products by the user. More particularly, the coupon processing server 30 may store in the coupon processing memory 32 historical or previously purchased products by the user. Of course, the previously purchased products may be stored in another memory or server and communicated to the coupon processing server 30.

The user may generate the user bid request based upon the previously purchased products. For example, the user may provide input by way of a single button or keypress to submit or generate a user bid request for some or all previously purchased products.

At Block 76, the coupon processing server 30 collects digital coupon offers from the coupon providers 22a-22n based upon the user bid request. The coupon providers 22a-22n, based upon the user bid request, provide bids in the form of digital coupon offers for the given product or products. A coupon provider may be a product manufacturer, retailer, etc. For example, a first coupon provider may provide a bid for $0.50 off a 12-pack of 16-ounce cans of "Cola-A", while a second coupon provider may provide a bid for $0.75 off a 12-pack of 16-ounce cans of "Cola-B". The coupon providers 22a-22n may submit the bids or digital coupon offers in accordance with a marketing plan or budget which may be automated by the coupon processing server 30 or managed manually also through the coupon processing server. For example, referring now additionally to FIG. 4, a given coupon provider 22a-22n may login to the coupon processing server 30 to see, for example, on a graphical user interface (GUI) 35 and/or in real-time, received user bid requests. The digital coupon offers may be for a same given product (e.g., a same UPC) or for a different specific product (e.g., different UPC), but a same product family or class.

In some embodiments, for example, when the user bid request is received during a checkout process at the POS terminal 50, the coupon processing server 30 may cooperate with the POS terminal to receive shopping cart data (i.e., product data for items scanned for purchase, in real-time). The product data may be communicated to the coupon providers 22a-22n so that the coupon providers can generate a digital coupon offer based upon the products being purchased. For example, if a coupon provider is a manufacturer of multiple products or brands, the coupon provider can generate a digital coupon offer for multiple products (e.g., a complex offer).

At Block 78, the coupon processing server 30 may anonymously communicate the digital coupon offers from each of the coupon providers 22a-22n to the given coupon provider (via the GUI 35, for example), so that the given coupon provider can see or know the bids or digital coupon offers from other coupon providers (e.g., number of bids, amount, and specific product(s)).

As this is performed anonymously, the given coupon provider 22a-22n typically is unaware of which other coupon provider is providing the bid or digital coupon offer. In other words, the given coupon provider 22a-22n may have knowledge of the value of or what the other coupon providers are bidding for the given product or products in the user bid request, but not any identifying information relating to the coupon provider. Any one or more of the coupon providers 22a-22n can update or edit their digital coupon offers. For example, a first coupon provider may configure their digital coupon offers for "Cola-A" to start at $0.50 off, and increase in increments of $0.05 until either they are the highest or until a predetermined threshold, (e.g., $1.00 off). Each coupon provider 22a-22n may configure their respective digital coupon offers accordingly, for example, also based upon additional factors, such as, time, geographic location, user buying history, keywords, etc. The coupon processing server 30 may continue to collect the bids or digital coupon offers for a threshold time period or until the user selects one or more of the digital coupon offers, for example, as will be described in further detail below.

At Block 80, the coupon processing server 30 selects one or more digital coupon offers from the collected digital coupon offers. The coupon processing server 30 may select a single digital coupon offer, for example, corresponding to the highest bid or offer (e.g., maximum discount or coupon value).

In another embodiment, the coupon processing server 30 may select more than one bid or digital coupon offer. For example, the coupon processing server 30 may rank the bids or digital coupon offers by value and select the top number of digital coupon offers. The coupon processing server 30 may select the one or more digital coupon offers based upon other and/or additional factors, for example, user preferences, geographic location, time (time of day), etc.

Upon selection of the digital coupon offers, the coupon processing server 30, at Block 82, communicates the selected digital coupon offer or offers to the mobile wireless communications device 40. The communicated digital coupon offers may be in the form of a user-selectable list whereby the user can select desired digital coupon offers for redemption. In some embodiments, the digital coupon offers may be communicated to the user based upon input from the user, for example, from the wireless communications device 40.

User selected digital coupon offers may be communicated to the coupon processing server 30, for example, from the mobile wireless communications device 40. In some embodiments, the user may be permitted to select a single digital coupon offer for a given product or product type (e.g., soda). In some embodiments, if the user does not select one or more digital coupon offers, for example, a few minutes after receipt of the user bid request, the digital coupon offers may expire.

The coupon processing server 30 may communicate corresponding digital coupons to the mobile wireless communication device 40 or cooperate to store the corresponding digital coupons in a digital wallet associated with the user, for example, for redemption at the POS terminal 50. In some embodiments, the coupon processing server 30 may cooperate directly with the POS terminal 50 for redemption thereat, for example, when the mobile wireless communications device 40 is determined to be geographically located at or near the POS terminal, for example, based upon the geographic position determining device. The method ends at Block 84.

The coupon processing system 20 advantageously permits coupon providers to "bid" on a digital coupon for a product at the request of the user. In contrast to conventional bidding systems, all participating coupon providers are able to bid on, for example, a single digital coupon. Moreover, in contrast to unconventional bidding techniques, a given coupon provider has knowledge of other bids for the given product from other coupon providers. Additionally, user information gathered or collected from the user bid request may provide increasingly valuable data for coupon providers that is typically not available with respect to conventional paper or digital coupons. That is, by requesting a bid, a user is indicating an interest, for example, in a particular product, and the user, by selecting a digital coupon offer, has provided coupon providers with threshold spending data and to which product or products this may correspond.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A coupon processing system comprising:
a remote user device; and
a coupon processing server configured to
receive a user offer request from the remote user device,
collect a plurality of digital coupon offers from a plurality of coupon providers based upon the user offer request,
anonymously communicate the plurality of digital coupon offers from each of the plurality of coupon providers to a given one of the plurality of coupon providers via a coupon provider interface and without identifying the coupon providers so that a given coupon provider can update, via the coupon provider interface and for a threshold time period, a corresponding one of the plurality of digital coupon offers based upon the digital coupon offers from other coupon providers,
select at least one digital coupon offer from the plurality thereof,
communicate the at least one digital coupon offer to said remote user device for display thereat, and
obtain user selection of the at least one digital coupon offer from the remote device and for redemption during a purchase transaction.

2. The coupon processing system of claim 1 wherein said coupon processing server is configured to store a plurality of previously purchased products by the user; and wherein the plurality of digital coupon offers are for at least one of the plurality of previously purchased products.

3. The coupon processing system of claim 1 wherein the user offer request is for a given product; and wherein the plurality of digital coupon offers are for the given product.

4. The coupon processing system of claim 3 wherein the given product comprises a plurality of products in a same product-type category.

5. The coupon processing system of claim 1 wherein said coupon processing server is configured to store the at least one digital coupon offer in a digital wallet associated with the user.

6. The coupon processing system of claim 1 wherein said coupon processing server is configured to select the at least one digital coupon offer from the plurality thereof based upon input from said remote user device.

7. The coupon processing system of claim 1 wherein the at least one digital coupon offer comprises a plurality of digital coupon offers.

8. The coupon processing system of claim 7 wherein said coupon processing server is configured to rank the plurality of digital coupon offers based upon a value thereof.

9. The coupon processing system of claim 1 further comprising a point-of-sale (POS) terminal; and wherein said coupon processing server is configured to communicate the at least one digital coupon offer to said remote user device for redemption at said POS terminal during the purchase transaction.

10. The coupon processing system of claim 1 wherein the remote user device comprises a mobile wireless communications device.

11. A coupon processing server comprising:
a memory; and
a processor coupled to said memory and configured to
  receive a user offer request from a remote user device,
  collect a plurality of digital coupon offers from a plurality of coupon providers based upon the user offer request,
  anonymously communicate the plurality of digital coupon offers from each of the plurality of coupon providers to a given one of the plurality of coupon providers via a coupon provider interface and without identifying the coupon providers so that a given coupon provider can update, via the coupon provider interface and for a threshold time period, a corresponding one of the plurality of digital coupon offers based upon the digital coupon offers from other coupon providers,
  select at least one digital coupon offer from the plurality thereof,
  communicate the at least one digital coupon offer to said remote user device for display thereat, and
  obtain user selection of the at least one digital coupon offer from the remote device and for redemption during a purchase transaction.

12. The coupon processing server of claim 11 wherein said processor is configured to store a plurality of previously purchased products by the user; and wherein the plurality of digital coupon offers are for at least one of the plurality of previously purchased products.

13. The coupon processing server of claim 11 wherein the user offer request is for a given product; and wherein the plurality of digital coupon offers are for the given product.

14. The coupon processing server of claim 13 wherein the given product comprises a plurality of products in a same product-type category.

15. A method of processing a coupon comprising:
using a coupon processing server to
  receive a user offer request from a remote user device,
  collect a plurality of digital coupon offers from a plurality of coupon providers based upon the user offer request,
  anonymously communicate the plurality of digital coupon offers from each of the plurality of coupon providers to a given one of the plurality of coupon providers via a coupon provider interface and without identifying the coupon providers so that a given coupon provider can update, via the coupon provider interface and for a threshold time period, a corresponding one of the plurality of digital coupon offers based upon the digital coupon offers from other coupon providers,
  select at least one digital coupon offer from the plurality thereof,
  communicate the at least one digital coupon offer to the remote user device for display thereat, and
  obtain user selection of the at least one digital coupon offer from the remote device and for redemption during a purchase transaction.

16. The method of claim 15 comprising using the coupon processing server to store a plurality of previously purchased products by the user; and wherein the plurality of digital coupon offers are for at least one of the plurality of previously purchased products.

17. The method of claim 15 wherein the user offer request is for a given product; and wherein the plurality of digital coupon offers are for the given product.

18. The method of claim 17 wherein the given product comprises a plurality of products in a same product-type category.

19. The method of claim 15 comprising using the coupon processing server to store the at least one digital coupon offer in a digital wallet associated with the user.

\* \* \* \* \*